(12) United States Patent
Magens et al.

(10) Patent No.: US 6,736,587 B2
(45) Date of Patent: May 18, 2004

(54) BATTERY-ELECTRICALLY OPERATED INDUSTRIAL TRUCK, PARTICULARLY COUNTERWEIGHTED FORK-LIFT TRUCK

(75) Inventors: Ernst-Peter Magens, Ammersbek (DE); Jonni Verch, Langeln (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 113 days.

(21) Appl. No.: 10/104,168

(22) Filed: Mar. 22, 2002

(65) Prior Publication Data

US 2002/0134599 A1 Sep. 26, 2002

(30) Foreign Application Priority Data

Mar. 24, 2001 (DE) .......................................... 101 14 571

(51) Int. Cl.[7] .............................................. B60R 18/02
(52) U.S. Cl. ...................................................... 414/673
(58) Field of Search ................................ 414/673, 662; 180/89.13, 89.15, 89.16, 89.18; 296/68

(56) References Cited

U.S. PATENT DOCUMENTS 3,275,092 A * 9/1966 Matthews .................. 180/68.5
4,074,785 A * 2/1978 Masevice ................... 180/68.5
4,312,418 A * 1/1982 Rittman .................... 180/69.21

FOREIGN PATENT DOCUMENTS

| DE | 73 06 935 | 8/1976 |
|----|-----------|--------|
| DE | 87 15 557.5 | 3/1988 |
| DE | 198 46 000 A1 | 5/1999 |
| DE | 198 15 121 A1 | 10/1999 |
| DE | 299 18 831 U1 | 3/2000 |

* cited by examiner

Primary Examiner—Eileen D. Lillis
Assistant Examiner—Charles A. Fox
(74) Attorney, Agent, or Firm—Vidas, Arrett & Steinkraus, P.A.

(57) ABSTRACT

A battery-electrically operated industrial truck, particularly a counterweighted lifting truck, having a basic body with a front load-bearing axle and a rear steering axle, a lift frame mounted on the basic body for a load-carrying means adjustable in height on the lift frame, and a driver's seat assembly on the basic body including a driver's seat, steering means, and control elements, characterized in that the basic body has a space open to the top to receive the battery and the driver's seat assembly is arranged on a lid-like cover which is displaceably guided in an approximately horizontally displaceable fashion at the upper side of the basic body to selectively unblock the reception space.

10 Claims, 3 Drawing Sheets

BATTERY-ELECTRICALLY OPERATED INDUSTRIAL TRUCK, PARTICULARLY COUNTERWEIGHTED FORK-LIFT TRUCK

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

A cantilevered lifting truck (counterweighted fork-lift truck) proves to be a universal equipment for the transport and handling of palletized unit loads. It is provided with a combustion-engine or battery-electric drive and may also be moved outdoors on an uneven terrain, which depends on the tires chosen. The power required to operate industrial trucks requires to be carried along by the vehicle. The power is stored in the fuel tank if combustion-engine operated lifting trucks are used and in a battery if battery-electric industrial trucks are used. The latter has to be recharged for a period of at least eight hours after the end of a shift. If the lifting truck is employed during several successive shifts the discharged battery requires to be exchanged against a freshly charged one after the end of each shift.

Since the battery mostly is centrally installed in the vehicle and its positioning is important for the vehicle's static stability and, hence, the usability of the industrial truck the exchange it needs necessitates great expenditure. Particularly for vehicles having a driver's cab as is frequently encountered for this vehicle type, some manipulations are necessary to perform the exchange. In addition, the overhead guard for the driver has to be designed so as to enable the battery to be removed by means of a hoisting gear. A difficulty in employing counterweighted lifting trucks of a known type is the so-called residual load-bearing capacity, i.e. the maximum ultimate load admissible depending on the lifting level. It decreases more and more with an increase in the lifting level for reasons of static stability, which reduces the economy in vehicle use, particularly in those cases where large loads require to be lifted to large levels. Moreover, if the driver carries out stacking operations at high levels his sight conditions will worsen, which has an adverse effect on the safety in operation, working speed, and physical stresses acting on the driver.

In battery-electrically operated fork-lift trucks, it is known to laterally push the battery out of the vehicle's chassis. For this purpose, the vehicle's chassis has to be of an appropriate construction and there has to be a stationary device onto which to shift the battery when it leaves the vehicle. The large lateral opening detracts from the frame structure of the vehicle.

It is further known to tilt the driver's seat module including the overhead guard for the driver, which covers the battery, to the rear for the maintenance of the battery and its exchange. This approach is comparable to a tiltable driver's cab on a lorry. Since the pivot is very much off the centre a relatively large force is necessary to tilt the driver's seat module and to keep it in the opened position. Therefore, the tilting operation mostly requires an extra driving mechanism. Furthermore, any objects not secured in the cab will fall out or fall into disorder during the tilting operation.

To enhance the residual load-bearing capacity, industrial trucks have become known in which the load-bearing axle is displaced to the front when the load is lifted with the inclination of the inclinable lift frame remaining unchanged. In this approach, the load-bearing axle which is generally under a heavy load requires to be displaced if static stability is intended to be enhanced, which presupposes an appropriate design of the load-bearing axle and its drive. Another approach to this problem, which is disclosed in DE 198 15 121 A1, provides a displaceable counterweight which, if required, may be displaced to the rear towards the vehicle's rear end along with the rear steering axle. In this embodiment, the wheelbase of the vehicle will vary during the displacing operation, which causes a misalignment of the steering geometry and a concomitant wear of the tires.

To improve the sight conditions while doing stacking at large lifting levels, industrial trucks have become known in which the driver's seat and possibly the driver's seat module is inclined to the rear while the load is being lifted and, thus, to improve the sight to the load at large lifting levels. This also requires a separate drive, which will be activated according to the respective lifting level.

It is the object of the invention to provide a battery-electrically operated industrial truck, particularly a counterweighted lifting truck, wherein the accessibility of the battery is optimized.

BRIEF SUMMARY OF THE INVENTION

In the invention, the basic body has a space open to the top to receive the battery. The reception space is preferably between the vehicle's axles. However, such reception spaces are known as such. According to the invention, the driver's seat assembly is arranged on a lid-like cover which is displaceably guided in an approximately horizontal fashion or even in an inclined fashion at the upper side of the basic body to selectively unblock the reception space. However, a drive is required if the arrangement is inclined.

The cover, along with the driver's seat assembly, may be displaced to the rear for the maintenance of the battery or a battery exchange. This makes the battery freely accessible from the top and, for example, may be simply removed by means of a hoisting gear from the vehicle towards the top. It is understood that if the upper side of the vehicle's basic body is configured in such a way the power and signal lines leading from the driver's seat assembly to the individual operating functions are made sufficiently long and flexible in order that a displacement of the driver's seat assembly relative to the basic body may readily take place such that line interruptions will not occur.

Various possible ways are imaginable in guiding the cover on the basic body. Thus, for example, a pure guideway may be provided using rails or the like. As an alternatively, according to an embodiment of the invention, there is an interaction of rollers on the cover or the basic body or rails on the basic body or the cover to obtain an easy-to-perform relative motion between the cover and the basic body. If possible, the motion should be such that it does not require a separate drive to make the battery reception space freely accessible.

To cause the cover to be safely held in the final positions, an embodiment of the invention provides that it be locked via locking means in the final positions. It is understood that the locking means are unlockable in an appropriate manner.

However, it is also imaginable to provide a separate drive for displacing the cover. This is mainly the case if it is desired that the residual load-bearing capacity be enhanced by displacing the cover to the rear. An aspect of the invention provides that sensors are provided for the weight of the load and/or the position of the load centre of gravity and/or the inclination of the lift frame and/or the lifting level of the load-bearing means, and that a control device for the driving mechanism controls the position of the cover in response to at least one of the sensor signals. This allows to displace the vehicle centre of gravity of the industrial truck by displacing the cover towards the steering axle, thus enhancing the static stability of the industrial truck in the longitudinal direction of the vehicle. A safe operation of the vehicle is possible if this displacement is combined with the maximum admissible travelling speed. For example, if a heavy load needs to be lifted to a very high level the driver will position the vehicle, for example, in front of a rack and will vertically place the inclinable lift frame. Subsequently, the lifting motion will begin and, starting from a certain lifting level which is reached, will automatically cause the cover to be displaced towards the vehicle's rear end until a maximum rear final position is reached. The space required therefor will also result from the operational width necessary for four-wheeled vehicles if there are close space conditions. For reasons of safety, the back of the cover may be provided with an appropriate sensor which detects obstacles or even persons opposing the pushing motion and will stop the pushing motion automatically as soon as an obstacle appears.

The invention involves a series of advantages. It allows an optimum accessibility of the battery for a maintenance and exchange. The displaceable cover enhances the residual load-bearing capacity of a counterweighted lifting truck and, hence, the economy of its use. The economy of the industrial truck is enhanced as well since it is extremely easy to exchange its battery. It also enhances the driver's sight when he performs stacking operations at large lifting levels and, hence, the vehicle's safety in operation when the cover is displaced towards the vehicle's rear end.

BRIEF DESCRIPTION OF THE SEVERAL VIEWS OF THE DRAWINGS

The invention will now be explained in more detail with reference to an embodiment illustrated in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
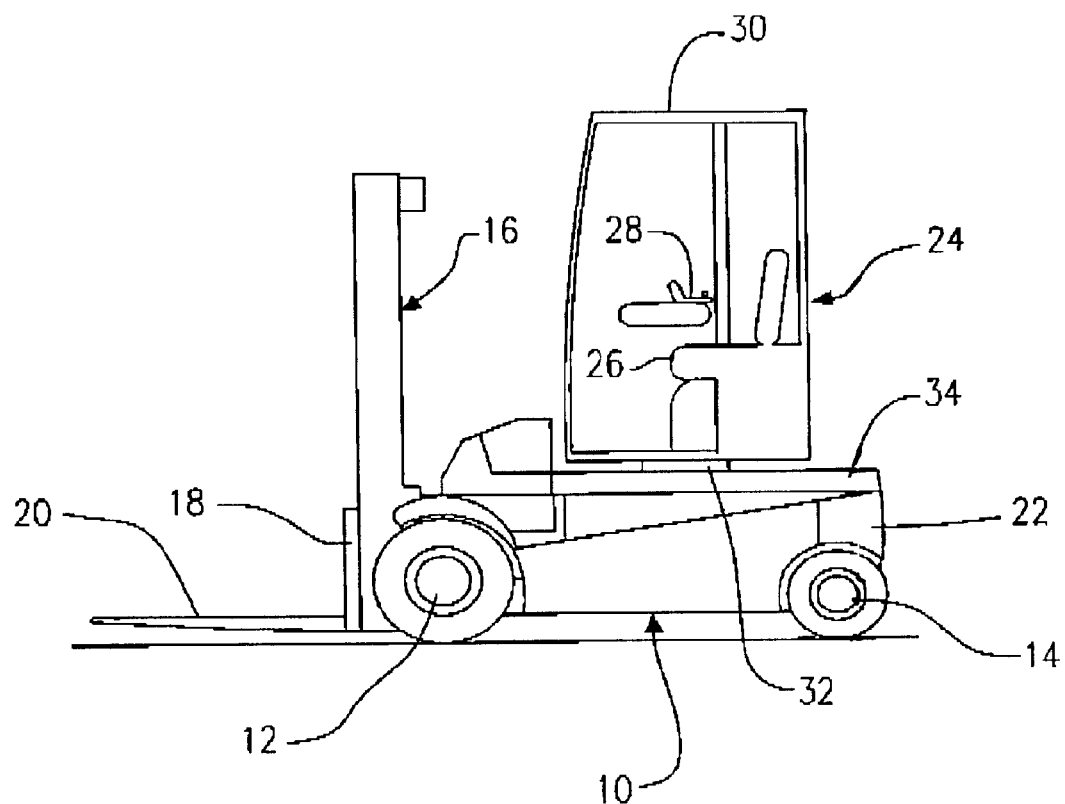
FIG. 1 schematically shows an industrial truck of the invention in a side view.
Figure 2:
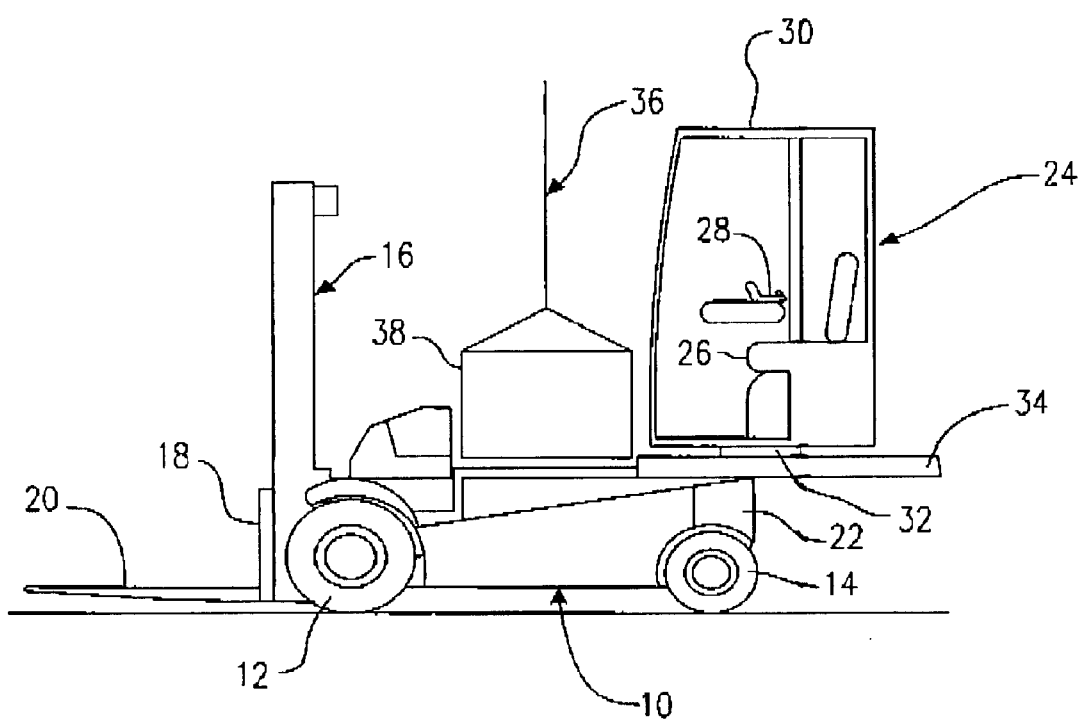
FIG. 2 shows a representation of the industrial truck of FIG. 1 during a battery exchange.
Figure 3:
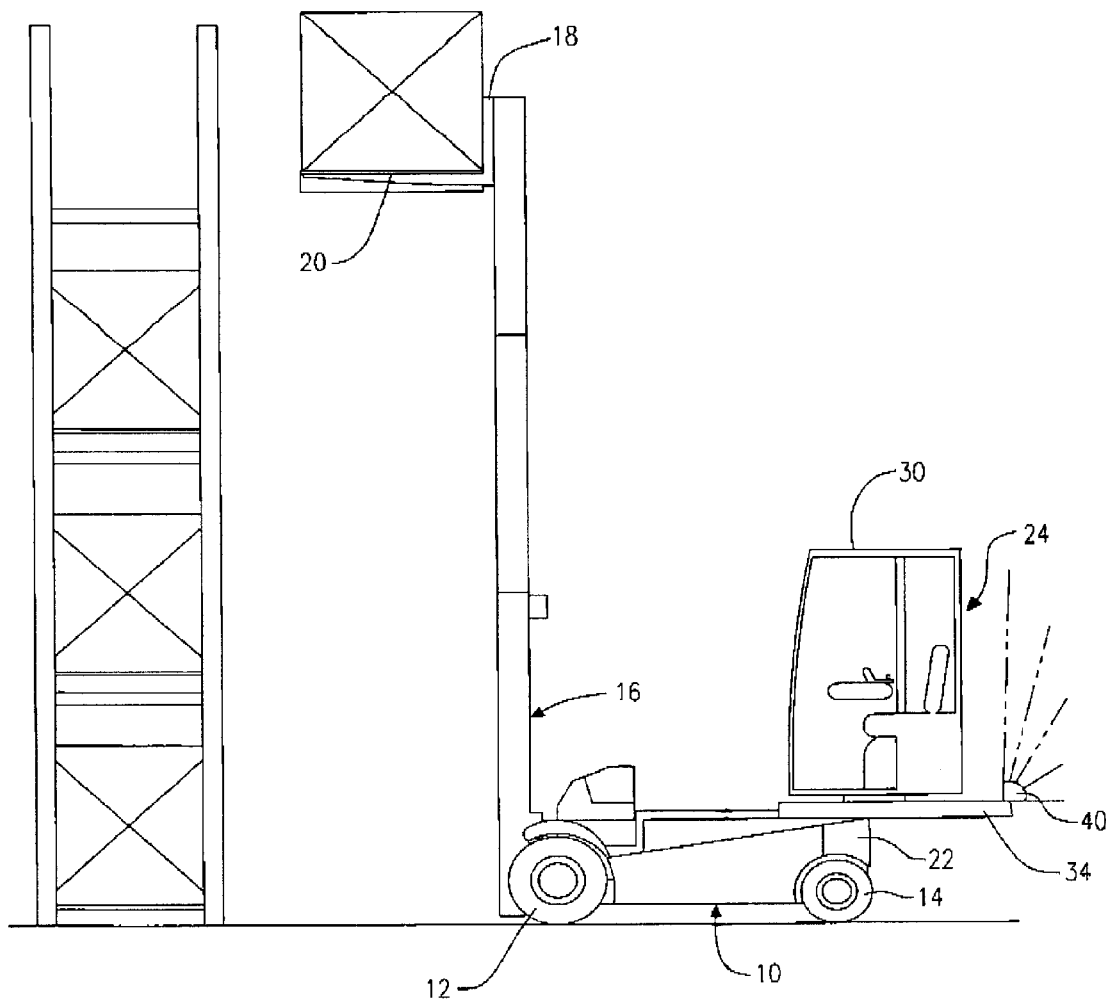
FIG. 3 shows the industrial truck of FIGS. 1 and 2 while lifting a load to a large lifting height.

The industrial truck illustrated in FIGS. 1 to 3 has a basic body 10 with a front load-bearing axle 12 and a rear longitudinal axle 14 or a single steered rear wheel which can also be designed as a twin wheel. It further has a lift frame 16 inclinably hinged on the vehicle's basic body 10 on which a forked carrier 18 is supported adjustably in height with a pair of fork prongs 20 for receiving a load. The vehicle's basic body 10 comprises all components necessary to make such a vehicle function as this has been known as such from the state of the art. It also has a counterweight 22 at its rear end.

A driver's cab 24 or a so-called driver's seat module which has a seat 26, a steering element 28 as well as further control elements not shown in detail, and an overhead guard 30 is pivotally arranged on a cover 34 via an appropriate bearing. As is apparent from FIGS. 1 to 3 the cover 34 is horizontally displaceable between an final position as is depicted in FIG. 1 and a second final position as is depicted in FIGS. 2 and 3. In FIG. 1, the cover 34 covers a battery reception space in the vehicle's basic body towards the top. FIG. 2 shows the way a battery 38 is lifted out of or is lowered into the reception space by means of a hoisting gear 36.

The cover 34 is guided on the basic body by means of appropriate guides such as U-rails on the basic body which interact with rollers (not shown) on the cover 34. The relative motion between the vehicle's basic body 10 and the cover 34 can be prevented by means of unlockable locking means which are not shown. If the guide is appropriately designed it is possible to displace the cover plus the cab 24 by hand without using an extra drive. To make the vehicle safe in operation, the position of the cover 34 with respect to the basic body 10 may be detected by an appropriate sensor or switch (not shown). The sensor signal is provided to the drive control of the vehicle so as to avoid situations hazardous to the operation of the vehicle. Thus, for example, the vehicle may be prevented from being driven when the cover 34 is partially or completely opened.

In specialty vehicles, the cover 34 may contain some part of the vehicle's counterweight and can be moved by a separate drive so that the overall centre of gravity of the vehicle will be displaced when the cover 34 is displaced. This enhances the static stability of the counterweighted lifting truck in the longitudinal direction of the vehicle. Combining this displacement with a maximum admissible travelling speed makes it possible to safely operate the vehicle.

The embodiment described last has a particularly advantageous effect if a heavy load is to be lifted to a very high level as is shown in FIG. 3. In such case, the driver positions the vehicle, for example, in front of a rack and places the inclinable lift frame vertically. Then, he initiates the lifting motion. From a certain lifting level onwards, the cover 33 automatically begins to be displaced along with the cab 24 towards the vehicle's rear end by means of the appropriate displacing drive. According to these sensor signals, the cover 34 will be moved to its rear final position as a maximum in response to the weight of the load, the position of the load centre of gravity, the inclination of the lift frame, the lifting level, and further criteria important for static stability which are determined by suitable sensors (not shown) which are appropriately mounted. The space required therefor will also result from the operational width necessary for four-wheeled vehicles even if there are close space conditions.

For reasons of safety, the back of the cover may be provided with a sensor 40 which detects obstacles or even persons opposing the pushing motion and will stop the motion automatically as soon as a danger is impending. Thus, a permanent verification of the equilibrium conditions may be performed by an appropriate intelligent unit, which is equipped with the sensors mentioned already and further sensors, during the whole stacking cycle. The cover 34 is stopped from moving as soon as it is to be is feared that there is a danger to persons and things or the static stability of the vehicle.

To stack the load in the rack according to FIG. 3, the vehicle can only be moved at a reduced speed when the cover is displaced to the rear.

As can be appreciated the sight conditions will enhance very considerably for the stacking operation by pushing the cover 34 rearwards, especially if lifting levels are high. This improves safety in operating the vehicle and reduces the physical stress acting on the operator.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A battery-electrically operated industrial truck, particularly a counterweighted lifting truck, having a basic body with a front load-bearing axle and a rear steering axle, a lift frame mounted on the basic body for a load-carrying means adjustable in height on the lift frame, and a driver's scat assembly on the basic body including a driver's seat, steering means, and control elements, characterized in that the basic body (10) has a space open to the top to receive the battery (38) and the driver's seat assembly (24) is arranged on a lid-like cover (34) which is displaceably guided in an approximately horizontally displaceable fashion at the upper side of the basic body (10) to selectively unblock the reception space.

2. The industrial truck according to claim 1, characterized in that the cover (34) is laterally provided with rollers or rails which interact with rails or rollers of the basic body (10).

3. The industrial truck according to claim 1, characterized in that unlockable locking means act between the cover (34) and the basic body (10) which lock the cover in a final position.

4. The industrial truck according to claim 1, characterized in that a driving mechanism is provided for the cover (34).

5. The industrial truck according to claim 4, characterized in that sensors are provided for the weight of the load and/or the position of the load centre of gravity and/or the inclination of the lift frame and/or the lifting level of the load-bearing means (18, 20), and that a control device for the driving mechanism controls the position of the cover (34) in response to at least one of the sensor signals.

6. The industrial truck according to claim 1, characterized in that the cover (34) has associated therewith a position sensor which detects the position of the cover, and that the signal of the position sensor is provided to a control device for driving the industrial truck.

7. The industrial truck according to claim 5, characterized in that the cover (34) contains at least some part of a counterweight at the rear end.

8. The industrial truck according to claim 5, characterized in that at least one sensor (40) is arranged at the back of the cover (34) which provides a signal to the control device for driving the cover in order to automatically interrupt the motion of the cover (34) in case of an obstacle detected by the sensor (40).

9. The industrial truck according to claim 1, characterized in that the driver's seat assembly has a driver's cab (24) and the driver's cab (24) is rotatably arranged on the cover (34).

10. The industrial truck according to claim 6, wherein the truck is prevented from being driven when the cover is partially or completely open.

* * * * *